US012112618B2

(12) United States Patent
Mundra et al.

(10) Patent No.: US 12,112,618 B2
(45) **Date of Patent: *Oct. 8, 2024**

(54) METHODS AND SYSTEMS FOR PATH LIGHTING

(71) Applicant: Comcast Cable Communications, LLC, Philadelphia, PA (US)

(72) Inventors: Arvind K. Mundra, Malvern, PA (US); Andrew Cannone, Norristown, PA (US); Nishant Doshi, Norristown, PA (US); Pragnesh Rabari, Chester Springs, PA (US); Alexander Cabinian, Cherry Hill, NJ (US); Krishna Chaitanya Madabooshi, Plymouth Meeting, PA (US); Daniel Hillegass, Warrington, PA (US); Dipal Patel, Dresher, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 321 days.

This patent is subject to a terminal disclaimer.

(21) Appl. No.: 17/237,846

(22) Filed: Apr. 22, 2021

(65) Prior Publication Data

US 2022/0044531 A1 Feb. 10, 2022

Related U.S. Application Data

(63) Continuation of application No. 16/041,190, filed on Jul. 20, 2018, now Pat. No. 11,037,416.

(51) Int. Cl.

*G08B 5/36* (2006.01)
*G08B 7/06* (2006.01)
*H05B 45/20* (2020.01)
*H05B 47/105* (2020.01)
*H05B 47/19* (2020.01)

(52) U.S. Cl.

CPC ............... *G08B 7/066* (2013.01); *G08B 5/36* (2013.01); *H05B 47/105* (2020.01)

(58) Field of Classification Search

CPC ..................................................... G08B 7/066

See application file for complete search history.

(56) References Cited

U.S. PATENT DOCUMENTS

| | | | | |
|---|---|---|---|---|
| 4,029,994 A * | 6/1977 | Iwans | B60Q 3/47 315/132 |
| 7,026,768 B1 | 4/2006 | Ruiz | |
| 7,199,724 B2 | 4/2007 | Danvir et al. | |
| 7,800,511 B1 | 9/2010 | Hutchison et al. | |
| 8,717,162 B2 | 5/2014 | Sundholm | |
| 9,595,845 B2 | 3/2017 | McBryde et al. | |
| 2007/0146115 A1* | 6/2007 | Roosli | E05B 47/00 340/5.6 |

(Continued)

*Primary Examiner* — Joseph H Feild
*Assistant Examiner* — Pameshanand Mahase
(74) *Attorney, Agent, or Firm* — Ballard Spahr LLP

(57) ABSTRACT

Methods and systems for illuminating a path are described. Data indicating a condition can be received by a lighting device. A light for output by the lighting device can be determined based on a location of the lighting device, such as a location of the lighting device relative to the condition and/or an egress. Data indicating the condition and/or data indicating the light for output can be transmitted to one or more other lighting devices, thereby illuminating a path away from the condition to the egress.

22 Claims, 7 Drawing Sheets

(56) References Cited

U.S. PATENT DOCUMENTS

| | | | | |
|---|---|---|---|---|
| 2007/0152808 | A1* | 7/2007 | LaCasse | G08B 29/188 340/577 |
| 2010/0102960 | A1 | 4/2010 | Simon et al. | |
| 2013/0293877 | A1 | 11/2013 | Ramer et al. | |
| 2014/0167969 | A1 | 6/2014 | Wedig et al. | |
| 2014/0203939 | A1 | 7/2014 | Harrington et al. | |
| 2015/0097683 | A1 | 4/2015 | Sloo et al. | |
| 2016/0003428 | A1 | 1/2016 | Anderson et al. | |
| 2016/0073479 | A1 | 3/2016 | Erchak et al. | |
| 2016/0123741 | A1* | 5/2016 | Mountain | G08B 5/36 701/533 |
| 2016/0275761 | A1 | 9/2016 | Tanaka et al. | |
| 2018/0188018 | A1 | 7/2018 | Brown et al. | |
| 2018/0365942 | A1* | 12/2018 | Molloy | A61B 5/0205 |
| 2019/0103021 | A1 | 4/2019 | Rosen et al. | |

* cited by examiner

400

METHODS AND SYSTEMS FOR PATH LIGHTING

CROSS REFERENCE TO RELATED APPLICATION

This application is a continuation of U.S. patent application Ser. No. 16/041,190, filed Jul. 20, 2018, which is herein incorporated by reference in its entirety.

BACKGROUND

Occupants of a structure (e.g., a dwelling such as a house or apartment, an office building, etc.) can attempt to locate a nearest exit during an emergency (e.g., a fire). However, the occupants may not know where the emergency is located and/or the safest route out of the structure. In some emergencies, heat, smoke, or other factors could obstruct a path to an exit.

SUMMARY

It is to be understood that both the following general description and the following detailed description are exemplary and explanatory only and are not restrictive. Provided are methods and systems for illuminating a path to an egress of a structure. During an emergency within a structure, lighting devices may provide guidance to the occupants within the structure towards an egress of the structure. The lighting devices may be light bulbs) that are configured for communicating with other devices (including other lighting devices) via a communications link (e.g., "smart bulbs") as well as processing data. A lighting device may determine the location of itself within the structure relative to other lighting devices, as well as determine the possible egresses of the structure. Based on the location of the condition and the location of the lighting device, the lighting device may determine an output for the lighting device. The lighting device may determine the location of an occupant within the structure and adjust the output of the lighting device to indicate a path to an exit.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
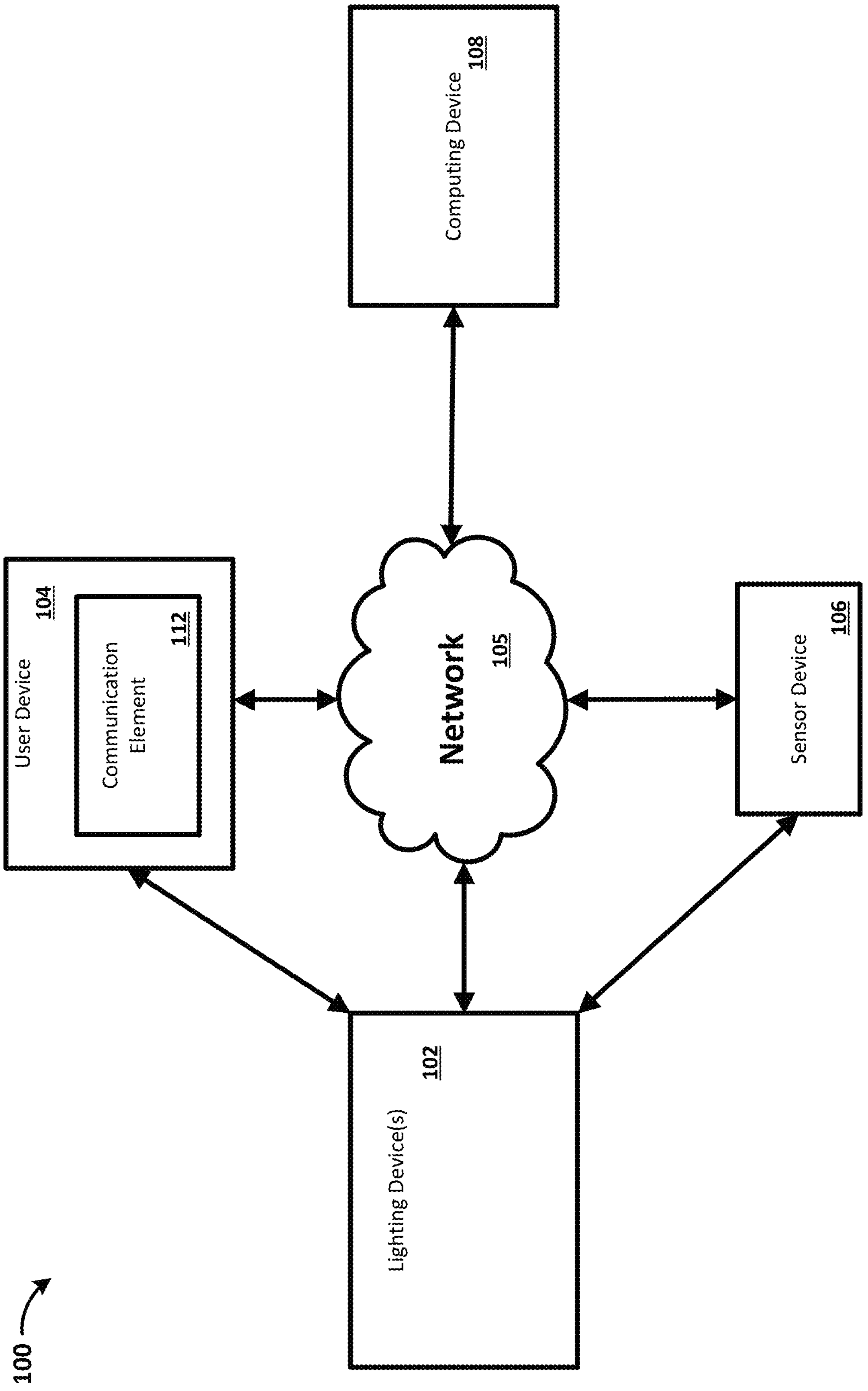
FIG. 1 is a system.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. When values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following detailed description of examples and the examples included therein and to the Figures and their previous and following description.

As will be appreciated by one skilled in the art, the methods and systems may take the form of an entirely hardware example, an entirely software example, or an example combining software and hardware example. Furthermore, the methods and systems may take the form of a computer program product on a computer-readable storage medium having computer-readable program instructions (e.g., computer software) embodied in the storage medium. The present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Note that in various examples this detailed disclosure may refer to a given entity performing some action. It should be understood that this language may in some cases mean that a system (e.g., a computer) owned and/or controlled by the given entity is actually performing the action.

Methods and systems are described for illuminating a path to an egress. Lighting devices may be located within a structure, and the lighting devices may receive data indicating egresses of the structure. In response to a condition associated with the structure (e.g., an emergency), lighting devices (e.g., smart light bulbs) within the structure may receive data (e.g., an ambient temperature, smoke particle counts, etc.) from installed heat and smoke detectors. The lighting devices may use the received data to determine a light for output. The lighting devices may illuminate more dangerous areas in lower brightness or a warning color (e.g., red), while safer areas are illuminated with higher brightness or a safety color (e.g., green). The brightness of the output may increase and/or decrease in order to direct occupants away from the condition and towards an egress (e.g., a window, door, etc.) of the structure. The lighting devices closest to the condition may be turned off and as the lighting devices move further away from the location of the condition, the brightness gradually increases. The lighting devices may determine the shortest and/or safest path out of the structure, and may base the output of the lighting devices on the shortest and/or safest path. Thus, the occupants may use the variation of the output of the lighting devices to safely exit the structure. Further, emergency personnel (e.g., first responders, firefighters) may follow the reverse path of the lighting devices to determine the source of the condition.

FIG. 1 shows a system 100 in which the present methods and systems may operate. The system 100 comprises one or more lighting devices 102, a user device 104, a sensor device 106, and a computing device 108, that can be in communication via a private and/or public network 105 such as the Internet, a local area network, and/or a mesh network. Those skilled in the art will appreciate that the present methods may be used in systems that employ both digital and analog equipment. One skilled in the art will appreciate that provided herein is a functional description and that the respective functions may be performed by software, hardware, or a combination of software and hardware.

The lighting devices 102 can include one or more components for providing a light for output. The lighting device 102 can include one or more light emitting diodes (LEDs), phosphorescent bulbs, fluorescent bulbs, compact fluorescent bulbs, incandescent bulbs, or other bulbs as can be appreciated. Such bulbs can either be directional (e.g., a flood light), or omnidirectional. The lighting devices 102 can be configured to operations including computing operations, signal transmission, and/or signal reception. The lighting devices 102 can include, One or more processors, memory, wired network interfaces, and/or wireless network interfaces. The lighting devices 102 can house these processors, memory, and/or network interfaces within a bulb (e.g., a “smart bulb”) such that the lighting devices 102 can be installed in a fixture compatible with the screw threads and/or electrical contacts of the bulb. The lighting devices 102 can include a chassis, case, or fixture housing the processors, memory, and/or network interfaces and including a socket for insertion of one or more bulbs.

The user device 104 can be an electronic device such as a computer, a smartphone, a laptop, a tablet, a set top box, a display device, or other device capable of communicating with the computing device 108. The user device 104 can comprise a communication element 112 for providing an interface to a user to interact with the user device 104 and/or the computing device 108. The communication element 112 can be any interface for presenting and/or receiving information to/from the user, such as user feedback. An interface may be communication interface such as a web browser (e.g., Internet Explorer, Mozilla Firefox, Google Chrome, Safari, or the like). Other software, hardware, and/or interfaces can be used to provide communication between the user and one or more of the user device 104 and the computing device 108. The communication element 112 can request or query various files from a local source and/or a remote source. The communication element 112 can send data to a local or remote device such as the computing device 108.

The sensor device 106 can include one or more devices configured to measure and/or detect environmental conditions. The sensor device 106 can include a smoke detector, carbon monoxide detector, natural gas sensor device, thermal detector, or other sensor device as can be appreciated. The sensor device 106 can be configured to generate an alarm signal in response to a measured environmental condition satisfying a threshold. The sensor device 106 can generate an alarm signal in response to a detected amount of smoke satisfying a threshold, or in response to an amount of measured heat satisfying a threshold. Generating an alarm signal can include generating an audible alarm sound. Generating an alarm signal can also include transmitting, via the network 105, one or more signals to the lighting devices 102, the user device 104, and/or the computing device 108.

The computing device 108 can be a server for communicating with the user device 104. The computing device 108 can communicate with the user device 104 for providing data and/or services. The computing device 108 can provide services such as network (e.g., Internet) connectivity, network printing, media management (e.g., media server), content services, streaming services, broadband services, or other network-related services. The computing device 108 can allow the user device 104 to interact with remote resources such as data, devices, and files. The computing device can be configured as (or disposed at) a central location (e.g., a headend, or processing facility), which can receive content (e.g., data, input programming) from multiple sources. The computing device 108 can combine the content from the multiple sources and can distribute the content to user (e.g., subscriber) locations via a distribution system.

A lighting device 102 can receive data indicating a condition within a structure in which it is installed. Conditions can include emergencies (e.g., fires, detected smoke, gas leaks, carbon monoxide emissions, or other detectable emergencies). A lighting device 102 can receive, via the network 105, data indicating a condition from a sensor device 106 in response to an environmental condition monitored by the sensor device 106 satisfying a threshold. A first lighting device 102 can receive the data indicating the condition from a second lighting device 102 that received the data indicating the condition from the sensor device 106. The data indicating the condition from the sensor device can indicate, A location of the sensor device 106, a location of the condition, and/or type of condition (e.g., a fire, smoke, a gas leak).

The lighting device 102 can determine a location of the lighting device 102 relative to one or more egresses of the structure. Egresses can include stairs, emergency exits, doors, or other egresses. Determining the location of the lighting device 102 can be performed in response to receiving the data indicating the condition. Determining the location of the lighting device 102 can also be performed independent of receiving the data indicating the condition. Determining the location of the lighting device 102 can be performed on activation or installation, at a predefined interval, in response to a user input to the lighting device 102 (e.g., a button or switch activation), or in response to a signal from the user device 104 or the computing device 108.

Determining the location of the lighting device 102 can include dynamically determining the location of the lighting device 102 using a global positioning system (GPS) radio and/or network triangulation. Determining the location of the lighting device 102 can also include receiving an indication of the location of the lighting device 102, e.g. from the user device 104. The determined location can then be compared to a map, a graph, a structural diagram, or other data encoding a mapping of the structure to determine the location of the lighting device 102 relative to the one or more egresses. Determining the location of the lighting device 102 relative to the one or egresses can include receiving data indicating the location of the lighting device 102 relative to the one or more egresses, e.g., from the user device 104 or the computing device 108.

The lighting device 102 can determine a location of the condition based on the received data indicating the condition. In response to the data indicating the condition identifying the location of the condition, the lighting device 102 can determine the location of the condition as the location identified in the data indicating the condition. In response to the data indicating the condition identifying the location of the sensor device 106 or the location of the sensor device 106 is predefined, the lighting device 102 can determine the location of the condition as the location of the sensor device 106.

The lighting device 102 can determine a light for output by the lighting device 102 based on the determined location of the condition and the determined location of the lighting device 102 relative to one or more egresses. The light can be determined to indicate a path to an egress of the one or more egresses (e.g., an egress nearest to the lighting device 102, an egress furthest from the condition, an egress outside of a predefined distance relative to the condition). Determining the light can include determining a color, a directionality, a brightness, a pulse or strobing frequency, or another attribute. The lighting device 102 can determine the light based on a proximity of the lighting device 102 relative to the condition and the egress. On a spectrum of red light to green light, the light can be determined as being more red closer to the condition, and progressively more green closer to the egress. The light can be determined as having a lower brightness closer to the condition and a greater brightness closer to the egress. The light can be determined as having an indication (e.g., a color, a brightness, a pulse frequency or other attribute) that the corresponding lighting device 102 is not considered part of a path to an egress. The lighting device 102 could be excluded from a path to an egress, or included in a path to egress that is further away or more difficult to access than another egress. The light of the corresponding lighting device could be dimmed, determined as being more red, or determined as having a directionality towards a path to the egress.

The light can also be determined by applying a pathfinding algorithm to determine a route away from the condition and towards the egress. A path from the condition to the egress can be determined. A lighting device 102 can be considered a node or "hop" on the path. If the lighting device 102 is included in the determined path (e.g., is included in an optimal or shortest route to the egress), the light can be determined to have a first color, e.g., green. If the lighting device 102 is not included in the determined path, the light can be determined to have a second color, e.g., red, and/or turned off or dimmed. A brightness, color saturation, or other attribute of the light can be determined based on the location of the lighting device 102 in the determined path. A brightness of the light can be determined such that lighting devices 102 emit brighter light as they are closer to the egress. If the lighting device 102 is configured for directional lighting through the use of a flood light bulb, a mirror, or a reflecting surface, a directionality of the light can be determined to direct the light to a next lighting device 102 in the path or another portion of the path. Thus, an occupant can easily find the egress by going in the direction of progressively brighter light.

The lighting device 102 can then cause output of the determined light. This can include selectively activating or deactivating one or more bulbs in a red-green-blue (RGB) configuration to cause output of a determined color. This can also include providing an amount of power to one or more bulbs to achieve a determined brightness. This can also include rotating, angling, or otherwise positioning a flood light, mirror, or reflective surface to direct the light in a determined direction.

The lighting device 102 can send data to one or more other lighting devices 102. The data can include, A location of the condition as determined by the lighting device 102 or indicated in the received data indicating the condition. The data can also indicate the determined light for output by the lighting device. The data can also indicate a determined path to the egress. The lighting devices 102 to which the data is transmitted can then determine their respective light for output. The other lighting devices can determine their respective locations relative to the egress and the condition, and each determine their respective light for output. The determined respective light for output can be based on the light indicated in the data. A lighting device 102 receiving data indicating a light can determine its respective light for output by increasing the brightness or modifying the color of the indicated light.

Figure 2A:
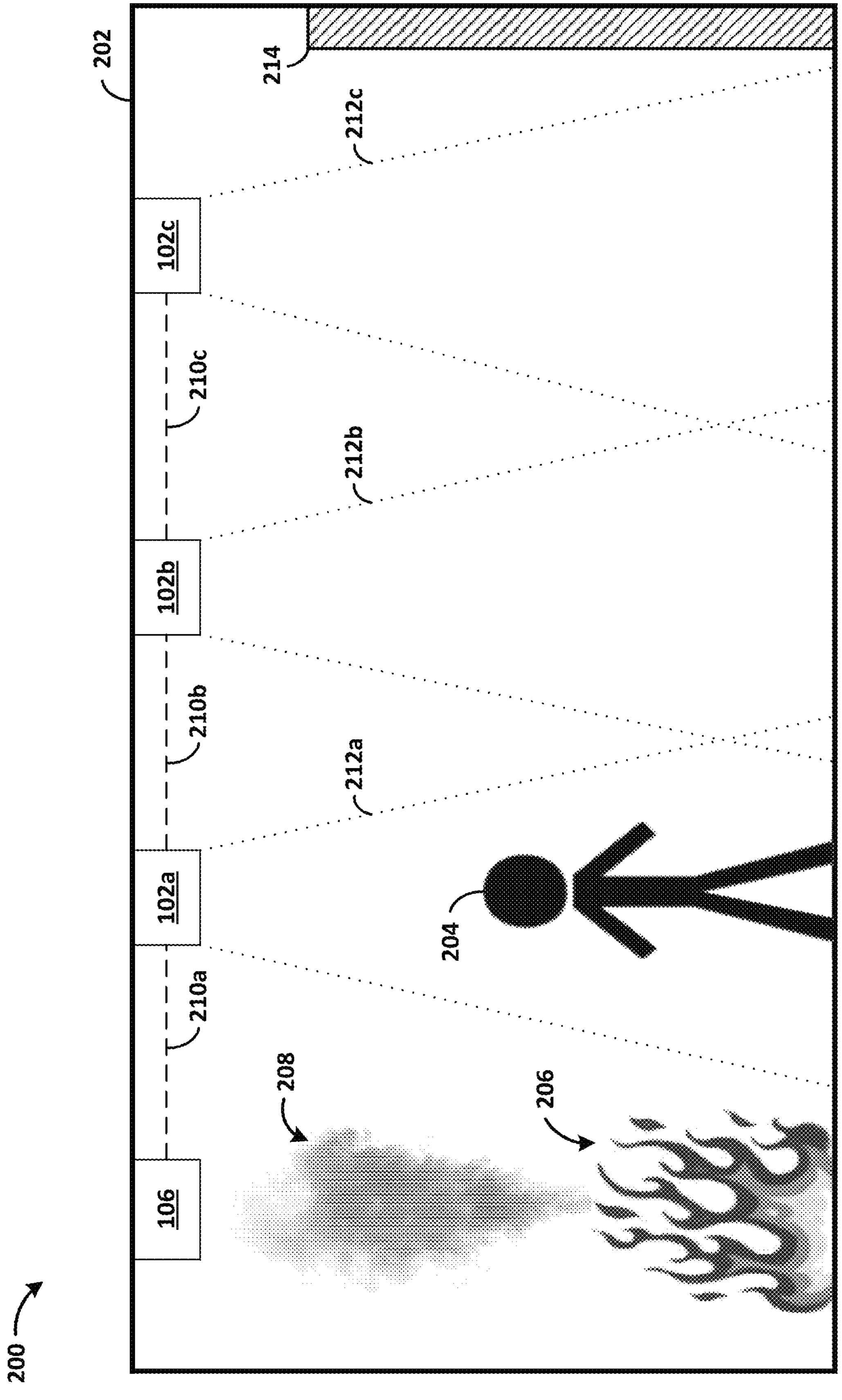
FIG. 2A is a system.

FIG. 2A shows a system 200 in which the present methods and systems may operate. Shown is a structure 200, which can include a room, a building, or other structure as can be appreciated. The structure 200 is occupied by an occupant 204. Within the structure 200 is a sensor device 106 in communication with a lighting device 102*a* via a communication link 210*a*. The lighting device 102*a* is in communication with a lighting device 102*b* via a communication link 210*b*. The lighting device 102*b* is in communication with a lighting device 102*c* via a communication link 210*c*. Each of the communication links 210*a*, 210*b*, and 210*c* can include a wired connection, a wireless connection (e.g., a WiFi connection, a personal area network connection, a mesh network connection), or combinations thereof. The structure 200 also includes an egress 214, which can include a door, a stairwell, an emergency exit, a fire escape, or other egress as can be appreciated.

The sensor device 106 can detect a condition In response to the sensor device 106 including a thermal detector, the sensor device 106 can detect a fire 206 in response to a heat level satisfying a threshold. In response to the sensor device 106 including a smoke detector, the sensor device 106 can detect an amount of smoke 208 produced by the fire 206 satisfying a threshold. In response to detecting the condition, the sensor device 106 can send data indicating the condition to the lighting device 102*a*. The data indicating the condition can comprise a location of the condition, a location of the sensor device 106, an identifier of the sensor device 106, a type of the condition, and/or other data.

The lighting device 102*a* can determine a light 212*a* for output in response to receiving the data indicating the condition. The lighting device 102*a* can determine a location of the lighting device 102*a* relative to the condition and/or the egress 214. The lighting device 102*a* can determine the location of the lighting device the lighting device 102*a*. The lighting device 102*a* can compare a location of the lighting device 102*a* to a location of the condition (e.g., indicated in the data indicating the condition and/or a known location corresponding to the sensor device 106 identified in the data indicating the condition). The lighting device 102*a* can compare a location of the lighting device 102*a* to a location of the egress 214, e.g. a predefined location for the egress 214. The lighting device 102*a* can determine a path (e.g., from the condition to the egress 214, from the lighting device 102*a* to the egress 214). The lighting device 102*a* can then determine a location on the lighting device 102*a* relative to the path (e.g., where on the path the lighting device 102*a* is located, whether or not the lighting device 102*a* is on the path).

Based on the location of the lighting device 102*a* relative to the condition and/or the egress, the lighting device 102*a* can determine the light 212*a*. A color or brightness of the light can shift based on the location of the lighting device 102*a* relative to the condition and/or the egress. The light 212*a* can be determined to be more red (or another color) and/or dimmer closer to the condition, and more green (or another color) and/or brighter closer to the egress 214. The light 212*a* can be determined to be red (or another color), dimmed, and/or off in response to the lighting device 214*a* being is off a path to the egress 214, and determined to be green (or another color), brighter, and/or on in response to the lighting device 214*a* being on the path.

The lighting device 102*a* can send data to the lighting device 102*b* via the communication link 210*b*. The data can include data indicating the condition and/or the light 212*a*. The light 102*b* can then determine a light 212*b* for output by a similar approach as set forth above with respect to the light 212*a* as determined by the lighting device 102*a*. In response to the data transmitted from the lighting device 102*a* to the lighting device 102*b* indicating the light 212*a*, the lighting device 102*b* can determine the light 212*b* based on the light 212*a*. The lighting device 102*b* can determine the light 212*b* by increasing a brightness or modifying a color saturation of the light 212*a* in response to the lighting device 102*b* being closer to the egress 214 than the lighting device 102*a*. The lighting device 102*b* can determine the light 212*b* by decreasing a brightness or modifying a color saturation of the light 212*a* in response to the lighting device 102*b* being closer to the egress 214 than the lighting device 102*a*.

The lighting device 102*b* can then send data to the lighting device 102*c* via the communication link 210*c*. The data can include data indicating the condition and/or the light 212*b*. The light 102*c* can then determine a light 212*c* for output by a similar approach as set forth above with respect to the light 212*b* as determined by the lighting device 102*b*.

Figure 2B:
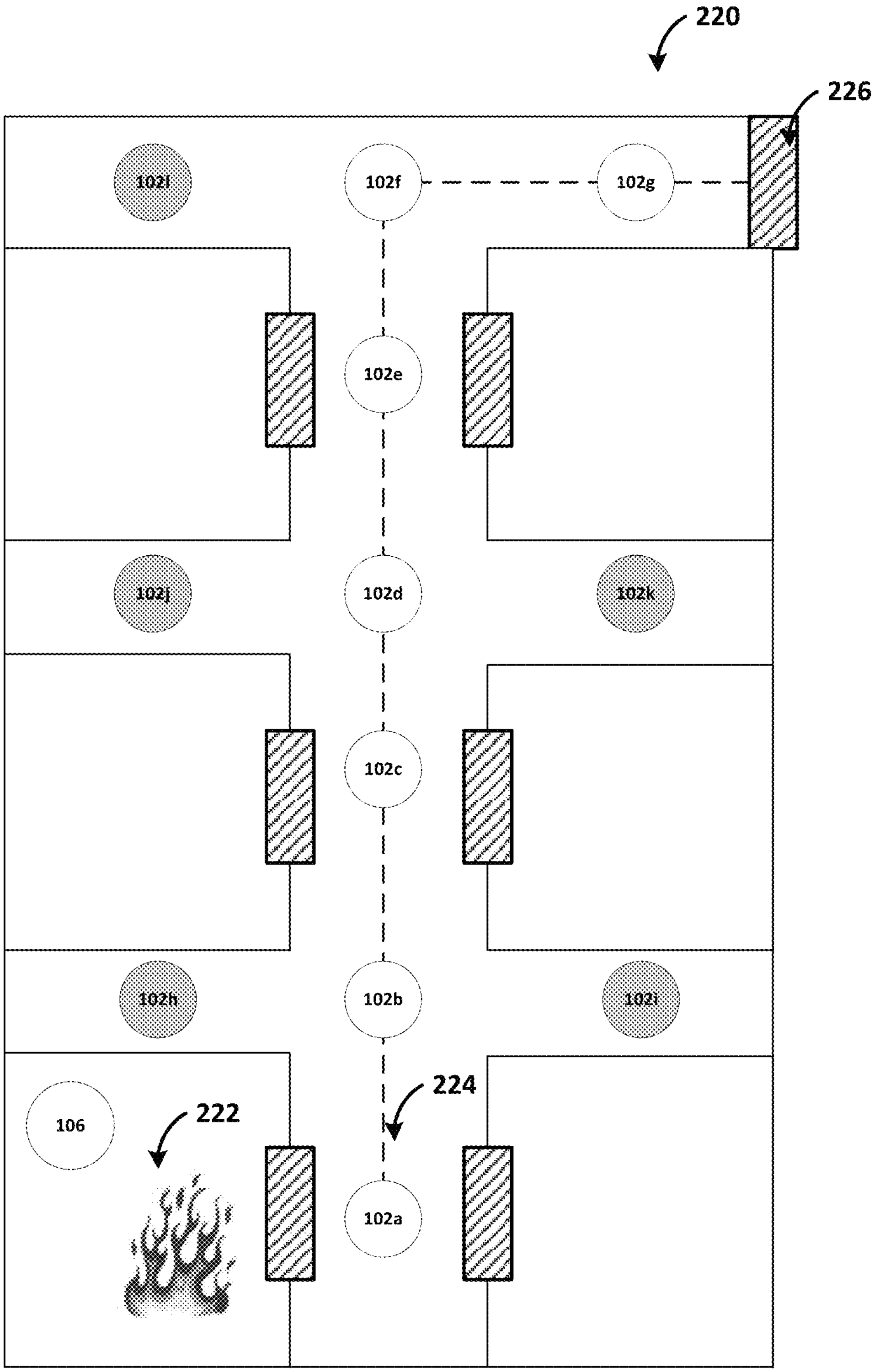
FIG. 2B is a system.

FIG. 2B shows a system 220 in which the present methods and systems may operate. Shown is an overhead view of a structure. Inside a room of the structure is a fire 222, detected by the sensor device 106. The sensor device 106 transmits an indication of the fire 222 to one or more of the lighting devices 102*a*-1. The one or more of the lighting devices 102*a*-1 then determine a path 224 from the fire 222 to an egress 226. The lighting devices 102*a*, 102*b*, 102*c*, 102*d*, 102*e*, 102*f*, and 102*g* are along the path 224. Each of the lighting devices 102*a*-*h* could have an increasing brightness, a color gradient, a pulse frequency, or other attribute guiding an occupant towards the egress 226 based on their location relative to the fire 222 and/or the egress 226. Lighting devices 102*h*, 102*i*, 102*j*, 102*k*, and 1021 are off the path 224. The lighting devices 102*h*-1 could be dimmed, turned off, lit a particular color (e.g., red), or otherwise indicating their exclusion from the path 224.

Figure 3:
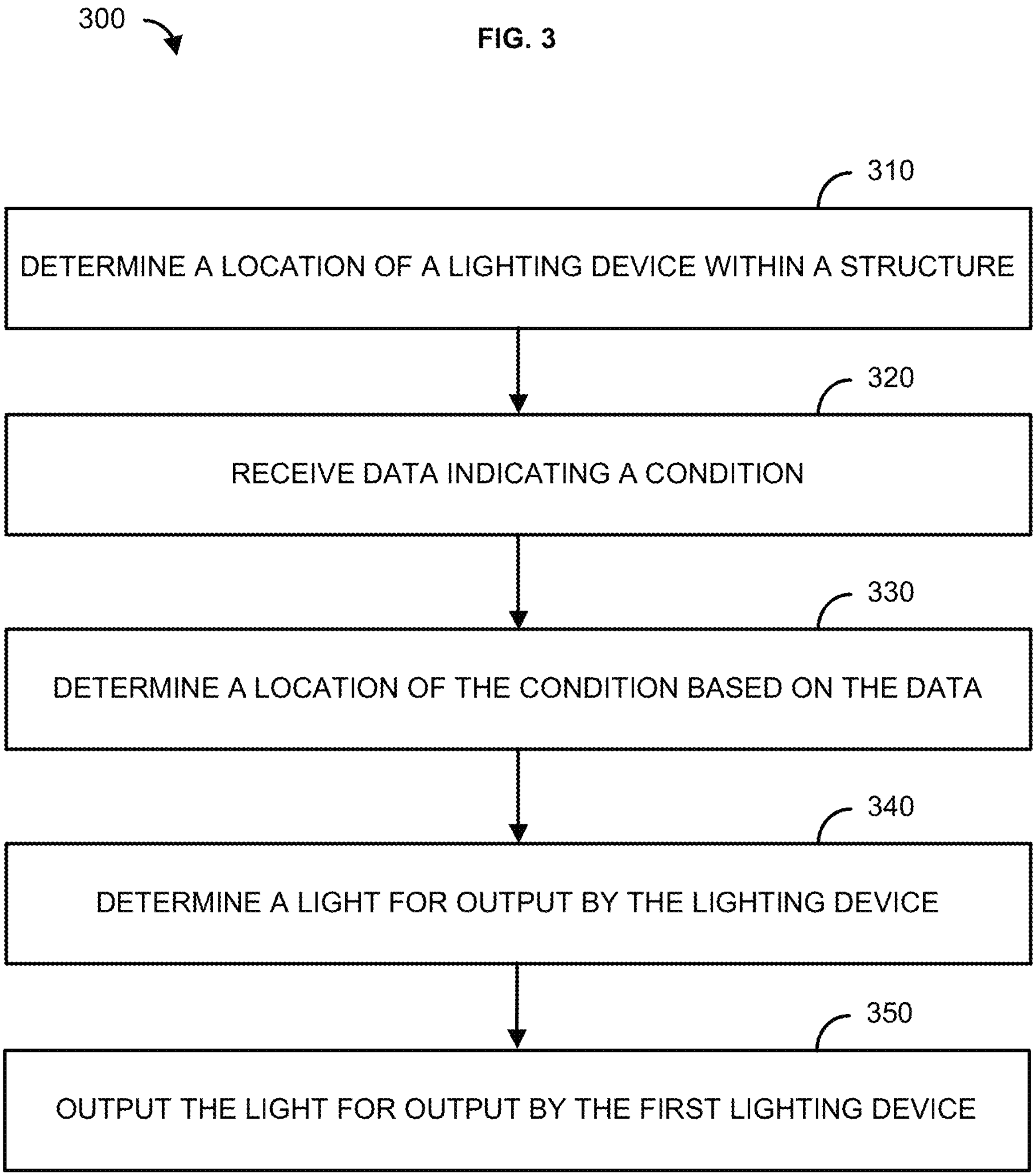
FIG. 3 is a flowchart of a method.

FIG. 3 is a flowchart 300 of a method. At step 310, a location of a lighting device 102 can be determined (e.g., by the lighting device 102). The lighting device 102 can determine the location of the lighting device 102 relative to one or more egresses of the structure. Egresses can include stairs, emergency exits, doors, or other egresses. Determining the location of the lighting device 102 can be performed on activation or installation, at a predefined interval, in response to a user input to the lighting device 102 (e.g., a button or switch activation), or in response to a signal from a user device 104, a sensor device 106, or a computing device 108.

Determining the location of the lighting device 102 can include dynamically determining the location of the lighting device 102 using a global positioning system (GPS) radio and/or network triangulation. Determining the location of the lighting device 102 can also include receiving an indication of the location of the lighting device 102, e.g. from the user device 104 or the computing device 108. The location of the lighting device 102 can also be determined based on a Received Signal Strength Indicator (RSSI) from the lighting device 102. The lighting device 102 can send a signal (e.g., a wireless network signal or other signal) to one or more other lighting devices 102, the user device, and/or the computing device 108. The respective RSSIs for the received signals can then be used to triangulate or otherwise determine the location of the lighting device 102. The determined location can then be compared to a map, graph, structural diagram, or other data encoding a mapping of the structure to determine the location of the lighting device 102 relative to the one or more egresses. Determining the location of the lighting device 102 relative to the one or egresses can include receiving data indicating the location of the lighting device 102 relative to the one or more egresses, e.g., from the user device 104 or the computing device 108.

At step 320, data indicating a condition within a structure can be received, e.g., by the lighting device 102 from a sensor device 106. Conditions can include emergencies (e.g., fires, detected smoke, gas leaks, carbon monoxide emissions, or other detectable emergencies). A lighting device 102 can receive, via the network 105, data indicating a condition from a sensor device 106 in response to an environmental condition monitored by the sensor device 106 satisfying a threshold. A first lighting device 102 can receive the data indicating the condition from a second lighting device 102 that received the data indicating the condition from the sensor device 106. The data indicating the condition can indicate, A location of the sensor device 106, a location of the condition, an identifier of the sensor device 106 sending the data, an identifier of another lighting device 102 sending the data, and/or type of condition (e.g., a fire, smoke, a gas leak).

At step 330 a location of the condition can be determined based on the received data indicating the condition, e.g., by the lighting device 120. In response to the data indicating the condition identifying the location of the condition, the location of the condition can be determined as the location identified in the data indicating the condition. In response to the data indicating the condition identifying the location of the sensor device 106 or the data indicating the condition identifying the sensor device 106 with a predefined location, the location of the condition can be determined as the location of the sensor device 106.

At step 340 a light for output by the lighting device 102 can be determined, e.g. by the lighting device 102. The light for output can be determined based on the determined location of the condition and/or the determined location of the lighting device 102 relative to one or more egresses. The light can be determined to indicate a path to an egress of the one or more egresses (e.g., an egress nearest to the lighting device 102, an egress furthest from the condition, an egress outside of a predefined distance relative to the condition). Determining the light can include determining a color, a directionality, a brightness, a pulse or strobing frequency, or another attribute. The light can be determined based on a proximity of the lighting device 102 relative to the condition and the egress. On a spectrum of red light to green light, the light can be determined as being more red closer to the condition, and progressively more green closer to the egress. The light can be determined as having a lower brightness when closer to the condition and a greater brightness closer to the egress.

The light can also be determined by applying a pathfinding algorithm to determine a route away from the condition and towards the egress. A path from the condition to the egress can be determined. A lighting device 102 can be considered a node or "hop" on the path. If the lighting device 102 is included in the determined path (e.g., is included in an optimal or shortest route to the egress), the light can be determined to have a first color, e.g., green. If the lighting device 102 is not included in the determined path, the light can be determined to have a second color, e.g., red, and/or turned off or dimmed. A brightness, color saturation, or other attribute of the light can be determined based on the location of the lighting device 102 in the determined path. A brightness of the light can be determined such that lighting devices 102 emit brighter light as they are closer to the egress. If the lighting device 102 is configured for directional lighting through the use of a flood light bulb, a mirror, or a reflecting surface, a directionality of the light can be determined to direct the light to a next lighting device 102 in the path or another portion of the path. Thus, an occupant can easily find the egress by going in the direction of progressively brighter light.

At step 350, the determined light can be output and/or caused to be output, e.g., by the lighting device 102. Outputting the determined light can include selectively activating or deactivating one or more bulbs to cause output of a determined color (e.g., selectively activating or deactivating one or more bulbs or diodes in an RGB color configuration) and/or to cause an output of a determined brightness. Outputting the determined light can also include providing an amount of power to one or more bulbs to achieve a determined brightness. Outputting the determined light can also include rotating, angling, or otherwise positioning a flood light, mirror, or reflective surface to direct the light in a determined direction.

Figure 4:
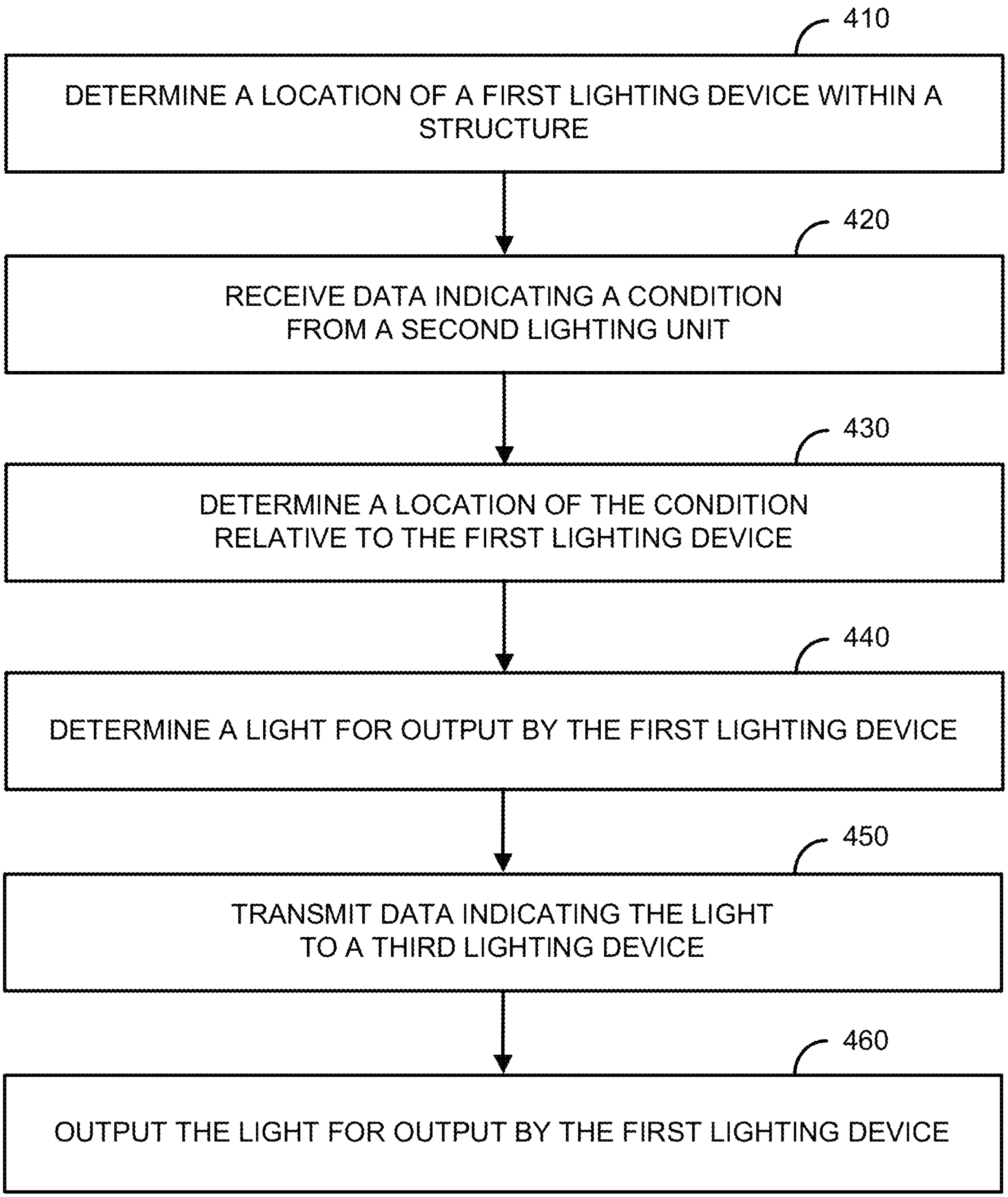
FIG. 4 is a flowchart of a method.

FIG. 4 is a flowchart 400 of a method. At step 410, a location of a first lighting device 102 can be determined (e.g., by the first lighting device 102). The first lighting device 102 can determine the location of the first lighting device 102 relative to one or more egresses of the structure. Egresses can include stairs, emergency exits, doors, or other egresses. Determining the location of the first lighting device 102 can be performed on activation or installation, at a predefined interval, in response to a user input to the first lighting device 102 (e.g., a button or switch activation), or in response to a signal from a user device 104, a sensor device 106, or a computing device 108.

Determining the location of the first lighting device 102 can include dynamically determining the location of the first lighting device 102 using a global positioning system (GPS) radio and/or network triangulation. Determining the location of the first lighting device 102 can also include receiving an indication of the location of the first lighting device 102, e.g. from the user device 104 or the computing device 108. The determined location can then be compared to a map, graph, structural diagram, or other data encoding a mapping of the structure to determine the location of the first lighting device 102 relative to the one or more egresses. Determining the location of the first lighting device 102 relative to the one or egresses can include receiving data indicating the location of the first lighting device 102 relative to the one or more egresses, e.g., from the user device 104 or the computing device 108.

At step 420, data indicating a condition within a structure can be received from a second lighting device 102, e.g., by the first lighting device 102. Conditions can include emergencies (e.g., fires, detected smoke, gas leaks, carbon monoxide emissions, or other detectable emergencies). The second lighting device 102 can receive, via the network 105, data indicating a condition from a sensor device 106 in response to an environmental condition monitored by the sensor device 106 satisfying a threshold. The second lighting device 102 can then send the data indicating the condition to the first lighting device via the network 105. The second lighting device 102 can receive the data indicating the condition from another lighting device 102 and send the received data to the first lighting device 102. The data indicating the condition can indicate, A location of the sensor device 106, a location of the condition, an identifier of the sensor device 106 sending the data, an identifier of another lighting device 102 sending the data, and/or type of condition (e.g., a fire, smoke, a gas leak). The data indicating the condition can also indicate a light for output by the second lighting device 102.

At step 430 a location of the condition can relative to the first lighting device 120 can be determined, e.g., by the first lighting device 120. The location of the condition relative to the first lighting device 120 can be determined based on the received data indicating the condition. In response to the data indicating the condition identifies the location of the condition, the location of the condition can be determined as the location identified in the data indicating the condition. In response to the data indicating the condition identifying the location of the sensor device 106 or the data indicating the condition identifies the sensor device 106 with a predefined location, the location of the condition can be determined as the location of the sensor device 106.

At step 440 a light for output by the first lighting device 102 can be determined, e.g. by the first lighting device 102. The light for output can be determined based on the determined location of the condition and/or the determined location of the first lighting device 102 relative to one or more egresses. The light can be determined indicate a path to an egress of the one or more egresses (e.g., an egress nearest to the lighting device 102, an egress furthest from the condition, an egress outside of a predefined distance relative to the condition). Determining the light can include determining a color, a directionality, a brightness, a pulse or strobing frequency, or another attribute. The light can be determined based on a proximity of the first lighting device 102 relative to the condition and the egress. On a spectrum of red light to green light, the light can be determined as being more red closer to the condition, and progressively more green closer to the egress. The light can be determined as having a lower brightness when closer to the condition and a greater brightness closer to the egress.

The light can also be determined by applying a pathfinding algorithm to determine a route away from the condition and towards the egress. A path from the condition to the egress can be determined. A first lighting device 102 can be considered a node or "hop" on the path. If the first lighting device 102 is included in the determined path (e.g., is included in an optimal or shortest route to the egress), the light can be determined to have a first color, e.g., green. If the first lighting device 102 is not included in the determined path, the light can be determined to have a second color, e.g., red, and/or turned off or dimmed. A brightness, color saturation, or other attribute of the light can be determined based on the location of the first lighting device 102 in the determined path. A brightness of the light can be determined such that lighting devices 102 emit brighter light as they are closer to the egress. If the first lighting device 102 is configured for directional lighting through the use of a flood light bulb, a mirror, or a reflecting surface, a directionality of the light can be determined to direct the light to a next lighting device 102 in the path or another portion of the path. Thus, an occupant can easily find the egress by going in the direction of progressively brighter light.

The light for output by the first lighting device 102 can also be determined based on a light for output by the second lighting device 102 (e.g., a light for output by the second lighting device 102 indicated in the data indicating the condition received by the first lighting device 102 from the second lighting device 102). The light for output by the first lighting device 102 as having a greater or lesser brightness, or having greater or lesser color values (e.g., greater or lesser red, green, and/or blue values) than the light for output by the second lighting device 102. The light for output by the first lighting device 102 can be determined based on a location of the second lighting device 102. If the second lighting device 102 is closer to an egress than the first lighting device 102, then the light for output by the first lighting device 102 may be determined to have lesser brightness or more red saturation than the light for output by the second lighting device 102. If the second lighting device 102 is closer to the condition than the first lighting device 102, then the light for output by the first lighting device 102 may be determined to have greater brightness or more green saturation than the light for output by the second lighting device 102.

At step 450 data indicating the light for output by the first lighting device 102 can be transmitted to a third lighting device 102 (e.g., by the first lighting device 102). The third lighting device 102 can be configured to determine a light for output by the third lighting device 102 based on the indicated light for output by the first lighting device 102. Additional data can also be transmitted to the third lighting device 102. The additional data can indicate a location of the condition. The data can also indicate a determined path to the egress. The third lighting device 102 to which the data is transmitted can include a next "hop" on a path to the egress relative to the first lighting device 102. The third lighting device 102 to which the data is transmitted can include one or more adjacent lighting devices 102 relative to the first lighting device 102 according to a graph model or linked network. The third lighting device 102 to which the data is transmitted can include one or more lighting devices in a transmission radius relative to the first lighting device 102 (e.g., in a mesh network configuration).

At step 460, the determined light can be output and/or caused to be output, e.g., by the first lighting device 102. Outputting the determined light can include selectively activating or deactivating one or more bulbs to cause output of a determined color (e.g., selectively activating or deactivating one or more bulbs or diodes in an RGB color configuration) and/or to cause an output of a determined brightness. Outputting the determined light can also include providing an amount of power to one or more bulbs to achieve a determined brightness. Outputting the determined light can also include rotating, angling, or otherwise positioning a flood light, mirror, or reflective surface to direct the light in a determined direction.

Figure 5:
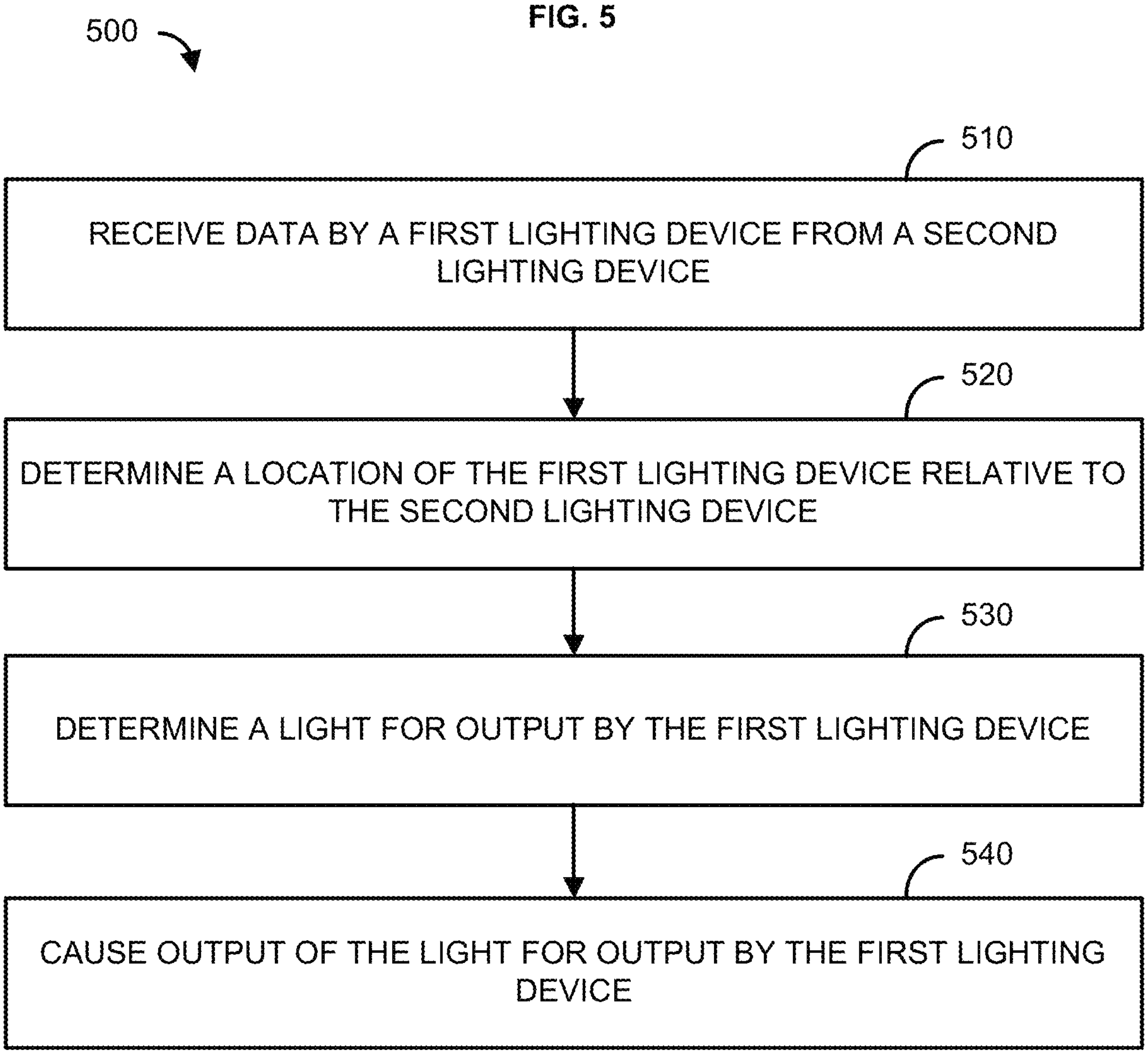
FIG. 5 is a flowchart of a method.

FIG. 5 is a flowchart 500 of a method. At step 510, data indicating a condition within a structure can be received by a first lighting device 102 from a second lighting device 102. The first lighting device 102 and second lighting device 102 can be included in a plurality of lighting devices 102. Conditions can include emergencies (e.g., fires, detected smoke, gas leaks, carbon monoxide emissions, or other detectable emergencies). The second lighting device 102 can receive, via the network 105, data indicating a condition from a sensor device 106 in response to an environmental condition monitored by the sensor device 106 satisfying a threshold. The second lighting device 102 can then send the data indicating the condition to the first lighting device via the network 105. The second lighting device 102 can receive the data indicating the condition from another lighting device 102 and send the received data to the first lighting device 102. The data indicating the condition can indicate, A location of the sensor device 106, a location of the condition, an identifier of the sensor device 106 sending the data, an identifier of another lighting device 102 sending the data, and/or type of condition (e.g., a fire, smoke, a gas leak). The data indicating the condition can also indicate a light for output by the second lighting device 102.

At step 520, a location of the first lighting device 102 relative to the second lighting device 102 can be determined (e.g., by the first lighting device 102). Determining the location of the first lighting device 102 relative to the second lighting device 102 can include dynamically determining the location of the first lighting device 102 using a global positioning system (GPS) radio and/or network triangulation. Determining the location of the first lighting device 102 relative to the second lighting device 102 can also include receiving an indication of the location of the first lighting device 102 and/or the second lighting device 102, e.g. from the user device 104 or the computing device 108. The location of the second lighting device 102 can be determined by accessing a predefined indication (e.g., a map) of the location of the second lighting device 102. The location of the second lighting device 102 can also be determined by receiving an indication of the location of the second lighting device 102 from the second lighting device 102. Determining the location of the first lighting device 102 relative to the second lighting device 102 can also include determining the location of the first lighting device 102 relative to the second lighting device 102 and the condition and/or one or more egresses. The data indicating the condition can indicate a location of the condition. Thus, by determining the mining the location of the first lighting device 102 relative to the second lighting device 102 and the condition and/or one or more egresses, it can be determined whether the first lighting device 102 is closer, compared to the second lighting device 102, to the condition or an egress.

At step 530 a light for output by the first lighting device 102 can be determined, e.g. by the first lighting device 102. The light for output can be determined based on the determined location of the condition and/or the determined location of the first lighting device 102 relative to one or more egresses. The light can be determined to indicate a path to an egress of the one or more egresses (e.g., an egress nearest to the lighting device 102, an egress furthest from the condition, an egress outside of a predefined distance relative to the condition). Determining the light can include determining a color, a directionality, a brightness, a pulse or strobing frequency, or another attribute. The light can be determined based on a proximity of the first lighting device 102 relative to the condition and the egress. On a spectrum of red light to green light, the light can be determined as being more red closer to the condition, and progressively more green closer to the egress. The light can be determined as having a lower brightness when closer to the condition and a greater brightness closer to the egress.

The light can also be determined by applying a pathfinding algorithm to determine a route away from the condition and towards the egress. A path from the condition to the egress can be determined. A first lighting device 102 can be considered a node or "hop" on the path. If the first lighting device 102 is included in the determined path (e.g., is included in an optimal or shortest route to the egress), the light can be determined to have a first color, e.g., green. If the first lighting device 102 is not included in the determined path, the light can be determined to have a second color, e.g., red, and/or turned off or dimmed. A brightness, color saturation, or other attribute of the light can be determined based on the location of the first lighting device 102 in the determined path. A brightness of the light can be determined such that lighting devices 102 emit brighter light as they are closer to the egress. If the first lighting device 102 is configured for directional lighting through the use of a flood light bulb, a mirror, or a reflecting surface, a directionality of the light can be determined to direct the light to a next lighting device 102 in the path or another portion of the path. Thus, an occupant can easily find the egress by going in the direction of progressively brighter light.

The light for output by the first lighting device 102 can also be determined based on a light for output by the second lighting device 102 (e.g., a light for output by the second lighting device 102 indicated in the data indicating the condition received by the first lighting device 102 from the second lighting device 102). The light for output by the first lighting device 102 as having a greater or lesser brightness, or having greater or lesser color values (e.g., greater or lesser red, green, and/or blue values) than the light for output by the second lighting device 102. The light for output by the first lighting device 102 can be determined based on a location of the second lighting device 102. If the second lighting device 102 is closer to an egress than the first lighting device 102, then the light for output by the first lighting device 102 may be determined to have lesser brightness or more red saturation than the light for output by the second lighting device 102. If the second lighting device 102 is closer to the condition than the first lighting device 102, then the light for output by the first lighting device 102 may be determined to have greater brightness or more green saturation than the light for output by the second lighting device 102.

At step 540, the determined light can be output and/or caused to be output, e.g., by the first lighting device 102. Outputting the determined light can include selectively activating or deactivating one or more bulbs to cause output of a determined color (e.g., selectively activating or deactivating one or more bulbs or diodes in an RGB color configuration) and/or to cause an output of a determined brightness. Outputting the determined light can also include providing an amount of power to one or more bulbs to achieve a determined brightness. Outputting the determined light can also include rotating, angling, or otherwise positioning a flood light, mirror, or reflective surface to direct the light in a determined direction.

Figure 6:
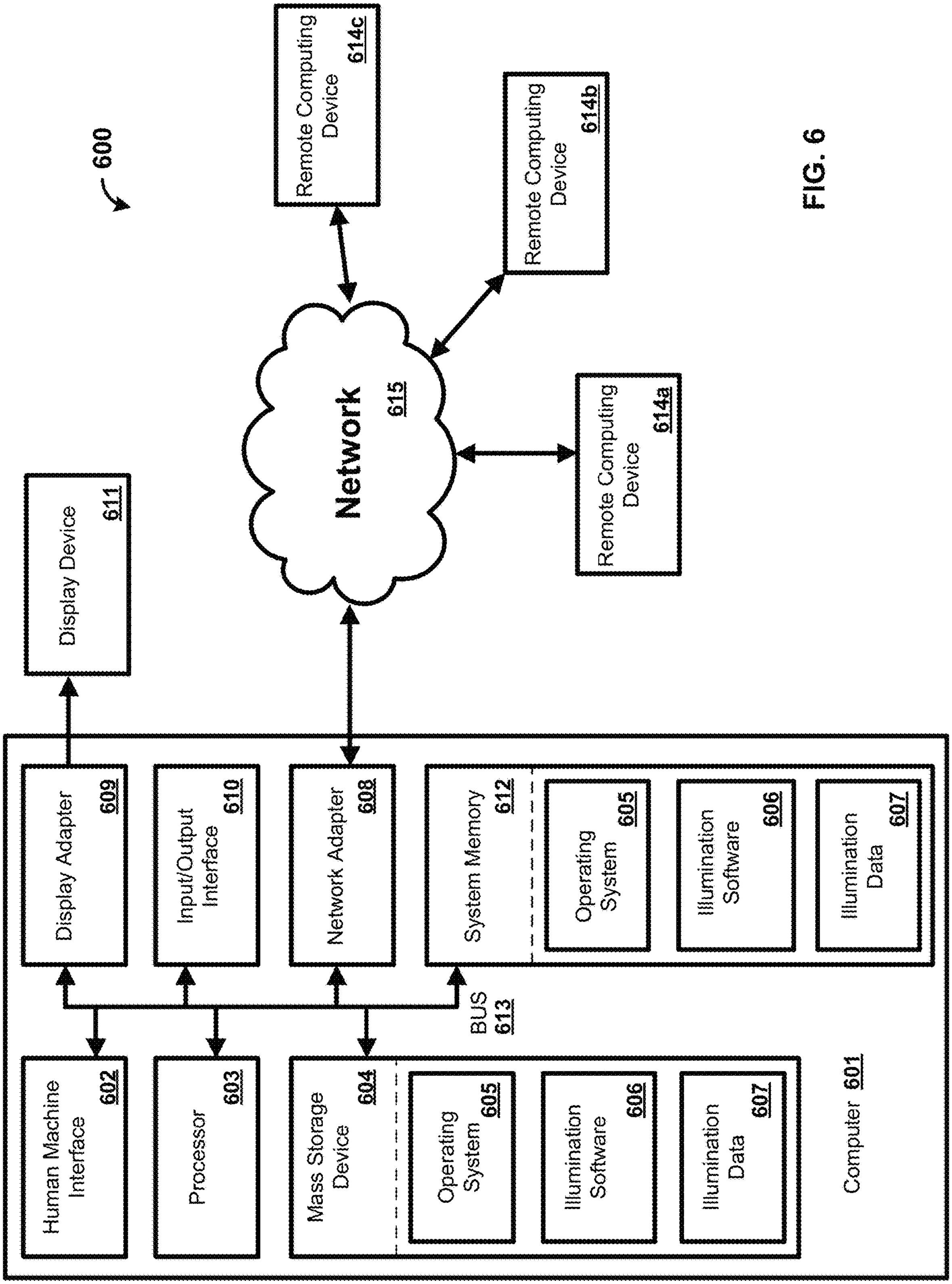
FIG. 6 is a block diagram of a computing device.

FIG. 6 is a block diagram showing an operating environment 600 for performing the described methods. An example computer 601 may be configured to perform any of the methods and/or systems described herein. The user device 102, the computing device 104, or the network device 116 of FIG. 1 may be a computer as shown in FIG. 6. The methods and systems described may utilize one or more computers to perform one or more functions in one or more locations. The example of the operating environment provided is only an example of an operating environment and is not intended to suggest any limitation as to the scope of use or functionality of operating environment architecture. Neither should the operating environment be interpreted as having any dependency or requirement relating to any one or combination of components shown in the example of the operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the described methods and systems may be performed by software components. The described systems and methods may be described in the general context of computer-executable instructions, such as program modules, being executed by one or more computers or other devices. Program modules comprise computer code, routines, programs, objects, components, data structures, etc., that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 601. The components of the computer 601 may comprise, but are not limited to, one or more processors 603, a system memory 612, and a system bus 613 that couples various system components including the one or more processors 603 to the system memory 612. The system 600 may utilize parallel computing.

The system bus 613 can be one or more of several possible types of bus structures, including a memory bus or memory controller, a peripheral bus, an accelerated graphics port, or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 613, and all buses specified in this description, may also be implemented over a wired or wireless network connection and each of the subsystems, including the one or more processors 603, a mass storage device 604, an operating system 605, network performance software 606, network performance data 607, a network adapter 608, the system memory 612, an Input/Output Interface 610, a display adapter 609, a display device 611, and a human machine interface 602, may be contained within one or more remote computing devices 614*a,b,c* at physically separate locations, connected through buses of this form, in effect implementing a fully distributed system.

The computer 601 typically comprises a variety of computer readable media. Exemplary readable media may be any available media that is accessible by the computer 601 and comprises both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the network performance data 607 and/or program modules such as the operating system 605 and the network performance software 606 that are immediately accessible to and/or are presently operated on by the one or more processors 603.

The computer 601 may also comprise other removable/non-removable, volatile/non-volatile computer storage media. FIG. 6 shows the mass storage device 604 which may provide non-volatile storage of computer code, computer readable instructions, data structures, program modules, and other data for the computer 601. And not meant to be limiting, the mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604, including the operating system 605 and the network performance software 606. The network performance data 607 may also be stored on the mass storage device 604. The network performance data 607 may be stored in any of one or more databases known in the art. Such databases comprise, DB2®, Microsoft® Access, Microsoft® SQL Server, Oracle®, mySQL, PostgreSQL, and the like. The databases may be centralized or distributed across multiple systems.

The user may enter commands and information into the computer 601 via an input device (not shown). Such input devices comprise, but are not limited to, a keyboard, pointing device (e.g., a "mouse"), a microphone, a joystick, a scanner, tactile input devices such as gloves, and other body coverings, and the like. These and other input devices may be connected to the one or more processors 603 via the human machine interface 602 that is coupled to the system bus 613, but may be connected by other interface and bus structures, such as a parallel port, game port, an IEEE 1394 Port (also known as a Firewire port), a serial port, or a universal serial bus (USB).

The display device 611 may also be connected to the system bus 613 via an interface, such as the display adapter 609. It is contemplated that the computer 601 may have more than one display adapter 609 and the computer 601 may have more than one display device 611. The display device 611 may be a monitor, an LCD (Liquid Crystal Display), or a projector. In addition to the display device 611, other output peripheral devices may comprise components such as speakers (not shown) and a printer (not shown) which may be connected to the computer 601 via the Input/Output Interface 610. Any step and/or result of the methods may be output in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614*a,b,c*. A remote computing device may be a personal computer, portable computer, smartphone, a server, a router, a network computer, a peer device or other common network node, and so on. Logical connections between the computer 601 and a remote computing device 614*a,b,c* may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

For ease of explanation, application programs and other executable program components such as the operating system 605 are shown herein as discrete blocks, although it is recognized that such programs and components reside at various times in different storage components of the computing device 601, and are executed by the one or more processors 603 of the computer. An implementation of the network performance software 606 may be stored on or transmitted across some form of computer readable media. Any of the described methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with specific examples, it is not intended that the scope be limited to the particular examples set forth, as the examples herein are intended in all respects to be possible examples rather than restrictive.

Unless otherwise expressly stated, it is in no way intended that any method set forth herein be construed as requiring that its steps be performed in a specific order. Where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other examples will be apparent to those skilled in the art from consideration of the specification and practice described herein. It is intended that the specification and examples be considered as exemplary only, with a true scope and spirit being indicated by the following claims.

What is claimed is:

1. A method comprising:

determining based on a location of a condition within a structure and a location of a user device within the structure, a path within the structure;

causing, based on a location of a first lighting device relative to the condition, the first lighting device to output a first light output indicative of the path; and causing, based on the first light output and based on a location of a second lighting device relative to the condition and relative to the first lighting device, the second lighting device to output a second light output indicative of the path.

2. The method of claim 1, wherein determining the path within the structure comprises receiving, from a sensing device, an indication of the condition.

3. The method of claim 1, wherein the location of the user device within the structure is associated with at least one of: a global positioning system location associated with the user device or a network triangulation location associated with the user device.

4. The method of claim 1, wherein determining the path within the structure comprises determining a signal strength between the user device and at least one of: the first lighting device, at least one computing device, or at least one network device.

5. The method of claim 1, wherein the path is associated with an egress of the structure.

6. The method of claim 1, wherein causing the first lighting device to output the first light output comprises:

determining, by the first lighting device, a location of the first lighting device relative to the condition and relative to an egress; and causing, based on the location of the first lighting device relative to the condition and relative to the egress, output of the first light output.

7. The method of claim 1, wherein causing the second lighting device to output the second light output comprises sending, from the first lighting device to the second lighting device, the first light output.

8. The method of claim 1, wherein the path is a path to at least one of: a door, a window, a staircase, or a fire escape.

9. A system comprising:

a computing device configured to:

determine based on a location of a condition within a structure and a location of a user device within the structure, a path within the structure;

cause, based on a location of a first lighting device relative to the condition, the first lighting device to output a first light output indicative of the path;

cause, based on the first light output and based on a location of a second lighting device relative to the condition and relative to the first lighting device, the second lighting device to output a second light output indicative of the path; and the first lighting device configured to output the first light output; and the second lighting device configured to output the second light output.

10. The system of claim 9, wherein the computing device is configured to determine the path by receiving, from a sensing device, an indication of the condition.

11. The system of claim 9, wherein the location of the user device comprises at least one of: a global positioning system location associated with the user device or a network triangulation location associated with the user device.

12. The system of claim 9, wherein the computing device is configured to determine the path within the structure by determining a signal strength between the user device and at least one of: the first lighting device or at least one network device.

13. The system of claim 9, wherein the path is associated with an egress of the structure.

14. The system of claim 9, wherein the computing device is further configured to cause the first lighting device to send, to the second lighting device, the first light output.

15. The system of claim 9, wherein the path is a path to at least one of: a door, a window, a staircase, or a fire escape.

16. An apparatus comprising:
- one or more processors; and
- memory storing processor executable instructions that, when executed by the one or more processors, cause the apparatus to:
  - determine, based on a location of a condition within a structure and a location of a user device within the structure, a path within the structure;
  - cause, based on a location of a first lighting device relative to the condition, the first lighting device to output a first light output indicative of the path; and
  - cause, based on the first light output and based on a location of a second lighting device relative to the condition and relative to the first lighting device, the second lighting device to, output a second light output indicative of the path.

17. The apparatus of claim 16, wherein the processor executable instructions that, when executed by the one or more processors, cause the apparatus to determine the path further cause the apparatus to receive, from a sensing device, an indication of the condition.

18. The apparatus of claim 16, wherein the processor executable instructions, when executed by the one or more processors, further cause the apparatus to determine at least one of: determine a global positioning system location associated with the user device or a network triangulation location associated with the user device.

19. The apparatus of claim 15, wherein the processor executable instructions, when executed by the one or more processors, further cause the apparatus to:
- determine the location of the first lighting device relative to the condition and relative to an egress; and
- cause, based on the location of the first lighting device relative to the condition and relative to the egress, output of the first light output.

20. The apparatus of claim 16, wherein the processor executable instructions, when executed by the one or more processors, further cause the apparatus to cause the first lighting device, to send to the second lighting device the first light output.

21. The apparatus of claim 16, wherein the processor executable instructions, when executed by the one or more processors, further cause the apparatus to:
- determine the location of the second lighting device relative to the an egress; and
- cause, based on the location of the second lighting device relative to the egress, the second lighting device to output the second light output.

22. The apparatus of claim 16, wherein the path is a path to at least one of: a door, a window, a staircase, or a fire escape.

* * * * *